Sept. 12, 1939.  W. S. PRAEG  2,172,545
METHOD OF MAKING ROTARY GEAR CUTTERS
Filed June 21, 1937  2 Sheets-Sheet 1

INVENTOR
WALTER S. PRAEG.
BY Whittemore Hulbert & Belknap
ATTORNEYS

Sept. 12, 1939.  W. S. PRAEG  2,172,545

METHOD OF MAKING ROTARY GEAR CUTTERS

Filed June 21, 1937  2 Sheets-Sheet 2

*INVENTOR*
WALTER S. PRAEG.
BY
Whittemore Hulbert + Belknap
*ATTORNEYS*

Patented Sept. 12, 1939

2,172,545

UNITED STATES PATENT OFFICE 2,172,545

METHOD OF MAKING ROTARY GEAR CUTTERS

Walter S. Praeg, Detroit, Mich., assignor to National Broach & Machine Company, Detroit, Mich., a corporation of Michigan Application June 21, 1937, Serial No. 149,510

1 Claim. (Cl. 76—101)

This invention relates to a rotary gear cutter and more particularly to a rotary gear cutter which is in the form of a gear having teeth of generally involute contour and having cutting edges provided on the faces of these teeth by forming grooves in these faces.

The prime object of the present invention is to produce cutters of this type by a new method of manufacture which comprises separately forming individual teeth, heat-treating said teeth to harden them, thereafter grinding the grooves in the faces of said individual teeth and finally assembling said teeth in a blank.

Further objects will be apparent on reading the following detailed description taken in conjunction with the accompanying drawings, in which—

Figure 12:
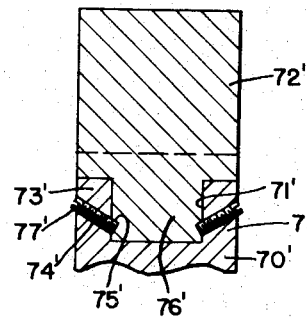
Figure 13:
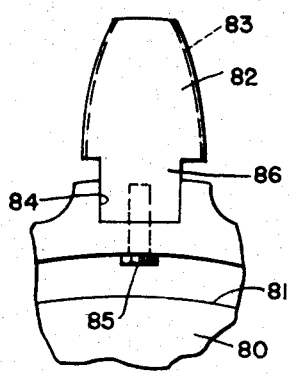
Figure 14:
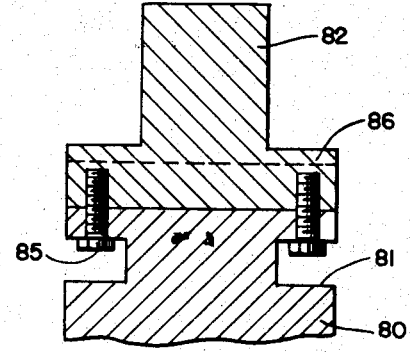

Figs. 4 to 7 inclusive are fragmentary views of various modified forms of inserted teeth;

Figs. 8 to 11 inclusive are fragmentary end views of cutters showing various other modified forms of inserted teeth;

Fig. 12 is a fragmentary sectional view of another modified form of inserted tooth;

Fig. 13 is a fragmentary section of another form of inserted tooth;

Fig. 14 is a fragmentary end view of the cutter shown in Fig. 13, and

Figure 15:
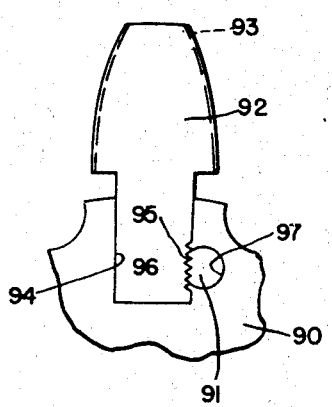
Figure 16:
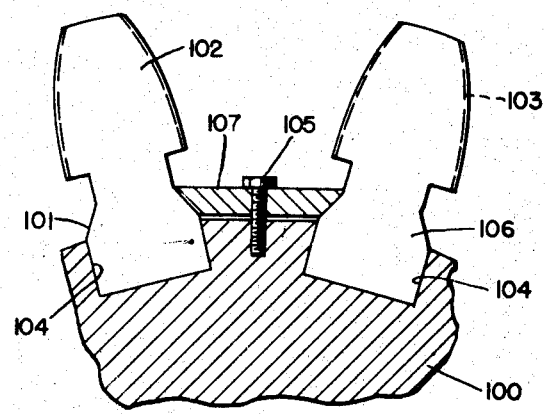

Figs. 15 and 16 are fragmentary end views of two other inserted teeth cutters.

Figure 1:
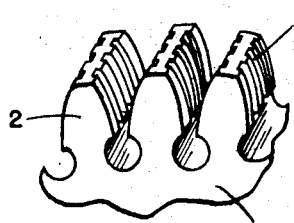
Fig. 1 is a fragmentary perspective of the type of cutter to which my invention relates.

The type of cutter illustrated in Fig. 1 as heretofore made comprises a disk 1 of high speed steel with teeth 2 cut on the periphery thereof and with these teeth modified in various manners to provide cutting edges on the faces of the teeth. A tool of this type is difficult to make, it being particularly difficult to machine grooves 3 in the faces of the gear teeth. Also, the material of the tooth is relatively expensive. As a matter of fact, it would be preferable to make the body portion of the gear of some other material less expensive but at the same time better adapted for its purposes. For this reason it will be seen that it is highly advantageous to provide inserted teeth. By this means the teeth may be formed separately of high speed steel and when forming each tooth separately, it is relatively easy to grind the serrations in the faces of the teeth. Thus marked economy may be practiced by manufacturing these cutters with inserted teeth, both for the reason that the material of the cutter blank is less expensive and because the expense of forming the teeth is lessened due to the fact that they may be more easily machined when separated from the blank. Furthermore, ground serrations are superior to serrations formed by other methods, giving smooth, accurate sides on the gashes.

Another highly advantageous feature of inserted teeth in this type of cutter resides in the replaceability of the teeth. As before stated, these tools are relatively expensive and it has heretofore been necessary when a single tooth became damaged, to replace the whole tool.

I have illustrated in the accompanying figures various modified forms of inserted teeth. In order to provide inserted teeth in a cutter of this type, it is necessary first to provide a construction which will insure that the teeth are very rigidly and firmly held in place in the cutter when in use. This is necessary because any flexibility introduces errors in the product. The rigidity of the cutter is therefore desirably greater than the rigidity of the gear being cut. It is also necessary to provide for removal of the teeth for replacement and repair.

Figure 2:
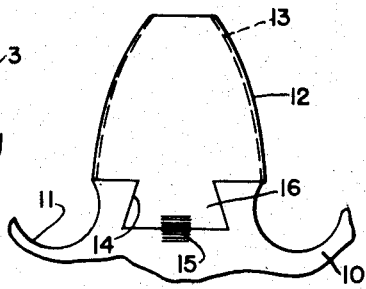
Fig. 2 is a fragmentary end view of a portion of a cutter showing an inserted tooth.

In the modification illustrated in Fig. 2, I form a cutter blank or body 10 of suitable alloy steel and with oil clearance recesses 11 formed around the periphery thereof. The material between adjacent oil recesses forms the support for the inserted tooth. As shown in this figure, I form a dove-tailed slot in this portion of the blank. The tooth 12 in this case, as in all modifications, is formed of high speed steel and is properly shaped and treated before it is assembled into the blank 10. In practice, the tooth 12 will be formed with a suitable generally involute contour on the faces thereof, will be heat treated and then the serrations 13 will be ground in the face of the tooth. The tooth has a cooperating dove-tailed tongue portion 16 adapted to fit snugly within the dove-tail slot or groove 14 cut in the blank. The blank is heated, the inserted tooth is placed in position and the blank is shrunk on to the tongue 16 of the inserted tooth. In order to provide further security I propose to spot weld the tongue 16 to the blank 10, as indicated at 15 in Fig. 2.

Figure 3:
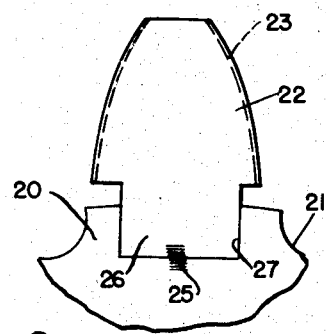
Fig. 3 is a fragmentary end view of a cutter showing a modified inserted tooth.

Fig. 3 is a modification somewhat similar to Fig. 2 and differs chiefly in the fact that instead of a dove-tail portion 16 the tongue 26 is rectangular. In this form the blank 20 is formed with peripheral oil clearance recesses 21 and the metal between the adjacent recesses is removed to form a rectangular slot 27. The tooth 22 is formed and treated separately from the blank, the final step being to serrate the faces of the teeth as indicated at 23. The tongue portion 26 is then inserted in the recesses 27 and the blank is shrunk. Again, I propose to insure additional security by spot welding, as at 25 in Fig. 3.

In all modified forms of my improved cutters, when the tool has been assembled, the final step in finishing is to finish grind the outsides of the teeth. This will insure proper spacing, lead, etc.

Figure 4:
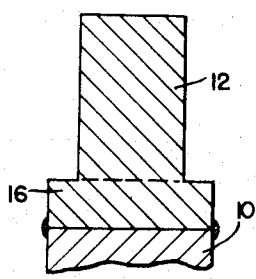

In Fig. 4 I have illustrated a modified form in which the body 10 is substantially wider than the width of the tooth 12. The tongue 16 of the tooth member is of the same width as the blank. This will insure that when the tongue 16 is shrunk into the blank 10, it will be maintained rigidly therein, even though in operation the portion of the tooth member more closely adjacent the tooth proper becomes heated. The additional width of the blank and tongue portion 16 also provides additional strength irrespective of any possible heating of the members in use. This modification and the modifications of Figs. 5 and 6 are practiced with either of the modifications illustrated in Figs. 2 or 3, or Figs. 8–11, to be later described.

Figure 5:
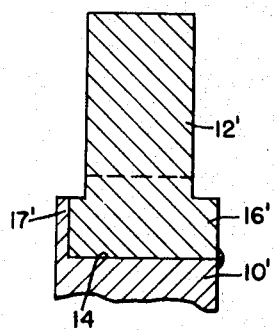

Fig. 5 illustrates another modification of the detail illustrated in Fig. 4. In this form, the slot 14' is of considerably greater length than the width of the tooth proper 12', but does not extend completely across the blank 10. A shoulder 17' is left at one end of the slot 14' and the tongue 16' abuts against this shoulder.

Figure 6:
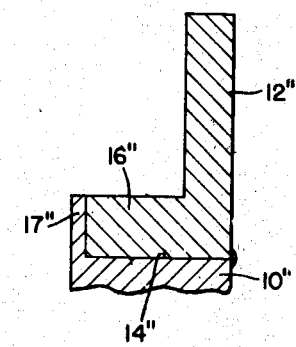

In Fig. 6 I have illustrated another modification in which the groove 14" again is considerably wider than the tooth proper 12", but does not extend clear across the blank 10". A shoulder 17" is left at one end of the groove 14" and the tongue 16" abuts against this shoulder. In this modification, the tooth proper 12" is placed at one end of the blank 10". This modification is particularly useful in certain jobs such as shoulder cutting.

Figure 7:
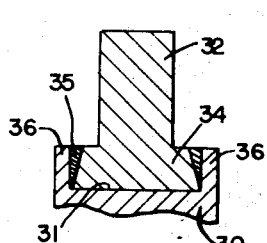

Still another modification is illustrated in Fig. 7 in which the body 30 is provided with a recess 31 which is closed at both ends by shoulder portions 36. The tooth member comprising a tooth proper 32 and a tongue member 34 is placed in this recess. The tongue portion 34 has beveled ends as can be readily seen, and a tapered clamp 35 is driven into the tapered recess left between the tongue 34 and the shoulder 36, or as an alternate, the portion 35 may represent welded material binding the parts together.

Figure 8:
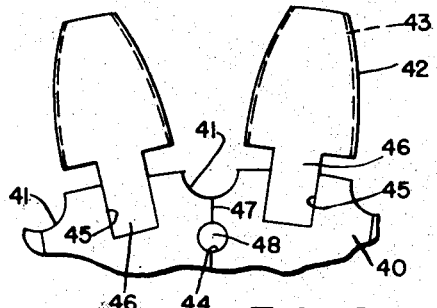

I have illustrated still another modification of my invention in Fig. 8. In this figure the blank 40 has recesses 45 formed therein. Between these recesses are oil clearance grooves 41. In the body of the blank between the recesses 45 and beneath the recesses 41 are holes 44. If desired, the material between the recess 41 and the hole 44 may be slit as indicated at 47. The other member comprises the tooth proper 42 and the tongue 46, the tongue 46 fitting closely within the recess 45. In order to provide the necessary clamping means, tapered pins indicated at 48 are driven in the holes 44, thereby wedging the tongues 46 rigidly in place. These teeth have serrations indicated at 43.

Figure 9:
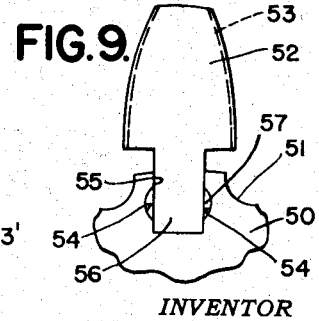

Another modification of my invention is illustrated in Fig. 9 in which the blank 50 has a recess 55 formed therein. This recess 55 has semi-circular portions 54 in the sides thereof as clearly shown. The tooth member comprising the tooth proper 52 serrated at 53 and the tongue portion 56, is inserted with the tongue 56 snugly received in the recess 55. Tapered pins 57 are then driven into the semi-circular recessees 54, bearing against the side portions of the tongue 56 and rigidly clamping the tooth in position.

Figure 10:
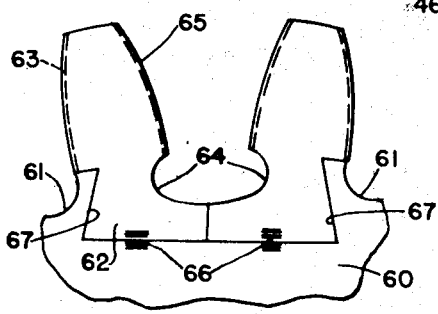

In Fig. 10 I have illustrated yet another modification of my invention particularly adapted for gear cutters of small diameter. In this form I provide for inserting two teeth at a time. The blank 60 is provided with a dove-tail recess 67 and suitable oil clearance recesses 61 are formed in the periphery thereof. The two adjacent teeth adapted to be inserted together are formed as shown in this figure, so that when assembled their tongue portions 62 together comprise a single dove-tailed tongue portion adapted to be received within the dove-tail groove 67 in the blank. At the bases of two adjacent teeth abutting each other is formed an oil clearance 64. It is contemplated in this form that the tongues 62 will be retained in position by shrinking the blank. It is further contemplated to insure the rigidity of the assembled device by spot welding as indicated at 66.

Figure 11:
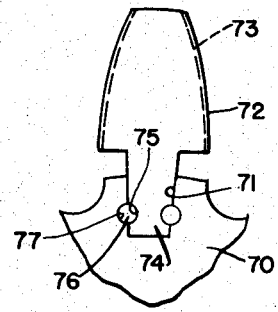

I have illustrated another modification of my improved inserted tooth gear cutter in Fig. 11. In this form the blank 70 is provided with a recess 71, with semi-circular recesses 77 formed in the side walls of the recess 71. The tooth member comprises a tooth proper 72 serrated at 73 and a tongue member 74. It will be noted that the tongue portion 74 has semi-circular recesses 75 adapted when the tooth is in inserted position to be complementary to the semi-circular recesses 77. Tapered pins 76 are then driven through the blank engaging both the blank and the tongue 74 and rigidly securing the tooth in assembled position.

Finally, in Fig. 12 I have illustrated another form of my invention comprising a blank 70' in which a recess 71' is provided. This recess does not extend clear across the width of the blank, shoulders 73' being left at each side thereof. The inserted tooth member comprises a tooth proper 72' and tongue 76'. As will be noted, the tooth proper 72' is of the same width as the blank, but the tongue portion 76' is of lesser width and is received by the recess 71'. The shoulders 73 have screw threaded openings 74' therein adapted to receive screws 77' which engage a recess 75' suitably formed in the tongue portion of the tooth member.

Another modification is illustrated in Figs. 13 and 14. In this form the blank 80 is provided with peripheral slots 84, extending across the blank at an angle corresponding to the desired helix angle. On both faces of the blank, annular recesses 81 are formed, leaving shoulders adjacent the botom of slots 84. The teeth to be inserted, comprising a tooth portion 82 and a tongue portion 86, are separately formed, and serrations 83 are ground on the faces of the tooth portions. The tongues 86 are then inserted in slots 84, and bolt 85 is screwed into the tongue through a suitable aperture in the shoulder adjacent the bottom of the slot. As illustrated in these figures, the tooth portion 82 is of less axial extent than the tongue 86. This, however, is optional, and the tooth may, in this as in the other forms, be of the same width as the tongue, or of lesser width and positioned either centrally or eccentrically on the tongue portions.

I have illustrated yet another embodiment of my invention in Figure 15. Here the blank 90 has peripheral slots 94. The tooth has a tooth portion 92, serrated at 93, and a tongue 96. A portion of the tongue has serrations or saw teeth as at 95. Adjacent the slot and opening into it is a drilled hole 97. After grinding the serrations in the face of the teeth, the tongue is inserted in the slot, and a tapered pin 91 is driven in the hole 97. The material of the pin being softer than the serrations 95, the pin is deformed to conform therewith, and a tight lock results.

Fig. 16 illustrates another embodiment of my invention. Here the blank 100 has peripheral slots 104 formed therein. The inserted teeth, comprising tooth portions 102, serrated at 103, and tongue portions 106 are inserted. The upper portion of the tongue 102 is inclined, as at 101. Suitably shaped locking means 107 engage these inclined surfaces, and clampingly lock the teeth in place through the medium of suitable securing means 105.

It is desired to emphasize at this time the importance of grinding the serrations in inserted teeth. Prior to my invention, it has been necessary to form the serrations by means of expensive special machines and the results obtained were necessarily inferior to ground serrations. Ground serrations exhibit superior smoothness and accuracy. This is important because the cutting edges of the tool are formed by the intersection of the serrations and the face of the tooth. Obviously, greater accuracy and superior finish in the serrations will improve the cutting edges, and this improvement will be retained throughout the life of the tool.

All of these modifications provide for ready assembly of the tool and for the removal of a single tooth if necessary. A tool made according to this invention retains all of the advantages of the integral tool formerly used and in addition has the advantages pointed out above, that is, economy in manufacture, separate grinding of the serrations in the tooth and replacement of damaged teeth.

For purposes of illustration, I have shown and described a number of modifications of specific cutters, but it will be apparent that the method defined is applicable generally to any serrated tooth rotary gear cutter.

What I claim as my invention is:

The method of making gear cutting tools in the form of bodies having teeth provided with cutting edges thereon, comprising forming recesses in the tool body, forming separate tooth members with tooth portions of desired contour and tongue portions on the bottom thereof, heat treating said teeth, grinding grooves in the faces of said teeth generally from top to bottom thereof to provide cutting edges thereon, placing said tongues in said recesses, and rigidly securing said tongues in said recesses.

WALTER S. PRAEG.